United States Patent
Chou et al.

(10) Patent No.: US 8,373,382 B2
(45) Date of Patent: Feb. 12, 2013

(54) SYSTEM OF A PLURALITY OF SERIES-CONNECTED FUEL CELL CONVERTER DEVICES AND METHOD FOR CONTROLLING THE SYSTEM

(75) Inventors: Chen-Kun Chou, Taoyuan (TW); Chi-Bin Wu, Taoyuan (TW)

(73) Assignee: Chung-Hsin Electric and Machinery Manufacturing Corp., Jhonghe, Taipei (TW)

( * ) Notice: Subject to any disclaimer, the term of this patent is extended or adjusted under 35 U.S.C. 154(b) by 407 days.

(21) Appl. No.: 12/882,366

(22) Filed: Sep. 15, 2010

(65) Prior Publication Data
US 2012/0007544 A1    Jan. 12, 2012

(30) Foreign Application Priority Data
Jul. 6, 2010 (TW) .............................. 099122241 A

(51) Int. Cl.
*H01M 10/44* (2006.01)
*H01M 10/46* (2006.01)
(52) U.S. Cl. ...................................................... 320/101
(58) Field of Classification Search .................. 320/101
See application file for complete search history.

(56) References Cited

U.S. PATENT DOCUMENTS

| | | | | |
|---|---|---|---|---|
| 6,387,556 | B1 * | 5/2002 | Fuglevand et al. | 429/429 |
| 7,058,484 | B1 * | 6/2006 | Potega | 700/297 |
| 7,378,818 | B2 * | 5/2008 | Fowler et al. | 320/119 |
| 2010/0188045 | A1 * | 7/2010 | Colello et al. | 320/118 |
| 2011/0008689 | A1 * | 1/2011 | Milacic et al. | 429/413 |

* cited by examiner

*Primary Examiner* — Edward Tso
*Assistant Examiner* — Ahmed Omar
(74) *Attorney, Agent, or Firm* — Stites & Harbison, PLLC; Juan Carlos A. Marquez, Esq.

(57) ABSTRACT

A system of a plurality of series-connected fuel cell converter devices and a method for controlling the system are provided. The system includes a plurality of fuel cell converter devices, a series connection unit, a power control unit, a Mux control unit, and a master controller. The output ends of a plurality of fuel cell converter devices are connected in series by the series connection unit. The master controller reads signals from the power control unit and the Mux control unit and determines accordingly which fuel cell converter devices need to be turned on to meet the requirement of a load. The method includes the steps of estimating a load, determining the number of the fuel cell converter devices to be turned on, calculating an output power, discharging, and charging. Thus, a plurality of fuel cell converter devices is controlled to output the required power of the load.

12 Claims, 2 Drawing Sheets

SYSTEM OF A PLURALITY OF SERIES-CONNECTED FUEL CELL CONVERTER DEVICES AND METHOD FOR CONTROLLING THE SYSTEM

BACKGROUND OF THE INVENTION

1. Technical Field

The present invention relates to a system of a plurality of series-connected fuel cell converter devices and a method for controlling the system. More particularly, the present invention relates to a system and a method for charging and discharging via a plurality of series-connected fuel cell converter devices.

2. Description of Related Art

Electricity, which has been indispensable to the daily lives of humans since the Industrial Revolution, is generated nowadays mainly by thermal or nuclear power. However, as both of these power generation methods have adverse impacts on the environment, and given the increasing abnormalities in today's global climate, it is imperative to generate electricity by alternative means.

Fuel cells generate electricity through chemical reactions, which do not produce substances harmful to the environment, and therefore fuel cells have been an important developing trend in power generation technology. For instance, a conventional fuel cell-based power generation system typically includes three major parts: a fuel cell stack for generating electricity, a converter for converting the unstable electricity generated by the fuel cell stack into a stable power source for output, and a battery for providing electricity in conjunction with the fuel cell stack when the fuel cell stack alone is insufficient to cope with an increase in the load, wherein the battery stops supplying electricity as soon as the power generated by the fuel cell stack meets the load requirement.

The aforesaid conventional fuel cell-based power generation system is disadvantageous in that the electricity generated by the fuel cell stack will not be output when the converter is damaged, which is extremely inconvenient. Moreover, a desired increase in the output power of the fuel cell stack is not achieved until chemical reactions in the fuel cell stack are completed. Therefore, if the load increases abruptly and goes beyond the capacity of the battery, a shortage of power supply is bound to occur, and the load will be affected as a result.

In addition, when fuel is added to the fuel cell stack, the chemical reactions of the added fuel will upset the stability of the output power temporarily, which is likely to damage the load.

BRIEF SUMMARY OF THE INVENTION

It is an object of the present invention to provide a system of a plurality of series-connected fuel cell converter devices and a method for controlling the system, wherein the system and the method can prevent the supply of electricity from being interrupted should one of the fuel cell converter devices be damaged, and wherein the system and the method can also prevent unstable power supply which may otherwise occur during fuel refill. In addition, the fuel cell converter devices are modularized and have their output ends connected in series, so as to be used in high-power applications.

To achieve the foregoing object, the present invention provides a system of a plurality of series-connected fuel cell converter devices, wherein the system includes: the a plurality of fuel cell converter devices for providing electricity; a series connection unit which is electrically connected to the output end of each fuel cell converter device and configured for outputting the electrical energy generated by each fuel cell converter device; a power control unit which is electrically connected to a load and configured for calculating the amount of electricity required by the load; a Mux control unit which is electrically connected to the series connection unit and configured for reading the amount of electrical energy output by the series connection unit; and a master controller which is electrically connected to each fuel cell converter device, the power control unit, and the Mux control unit and the master controller is configured for reading from the power control unit and the Mux control unit and thereby controlling the amount of electricity to be discharged by the fuel cell converter devices.

The present invention also provides a method for controlling the foregoing system of the a plurality of series-connected fuel cell converter devices, wherein the method includes: a step of estimating a load, wherein a load power value and a load output voltage value required by the load are calculated; a step of determining the number of the fuel cell converter devices to be turned on, wherein the number of the fuel cell converter devices that need to be turned on is determined according to the load power value or the load output voltage value, and the fuel cell converter devices selected are defined as the working fuel cell converter devices; a step of calculating an output power, wherein a required output power assigned to and to be provided by each working fuel cell converter device is calculated; a step of discharging, wherein when the available output power of a fuel cell in any of the working fuel cell converter devices is lower than the required output power, a corresponding bi-directional converter discharges a corresponding battery so that the power output by that particular working fuel cell converter device reaches the required output power; and a step of charging, wherein when the amount of electricity of the battery of the working fuel cell converter devices is smaller than a predetermined amount and the available output power of the corresponding fuel cell is higher than the required output power, the fuel cell begins to charge the corresponding battery.

Implementation of the present invention at least involves the following inventive steps:

1. Even if one of the fuel cell converter devices or one of the fuel cells is damaged, power supply will not be interrupted.
2. Unstable power supply associated with the addition of fuel is prevented.
3. The fuel cell converter devices to be turned on are selected according to load requirements so as to meet the required load voltage or increase the output power.
4. With the elements in the fuel cell-based power generation system being modularized, and the output ends of the fuel cell converter devices being connected in series, the present invention is suitable for use in high-power applications.

A detailed description of the features and advantages of the present invention is given below so that a person skilled in the art is enabled to gain insight into the technical contents disclosed herein and implement the present invention accordingly. A person skilled in the art can easily understand the objects and advantages of the present invention by referring to the disclosure of the specification, the claims, and the accompanying drawings.

DETAILED DESCRIPTION OF THE INVENTION

Figure 1:
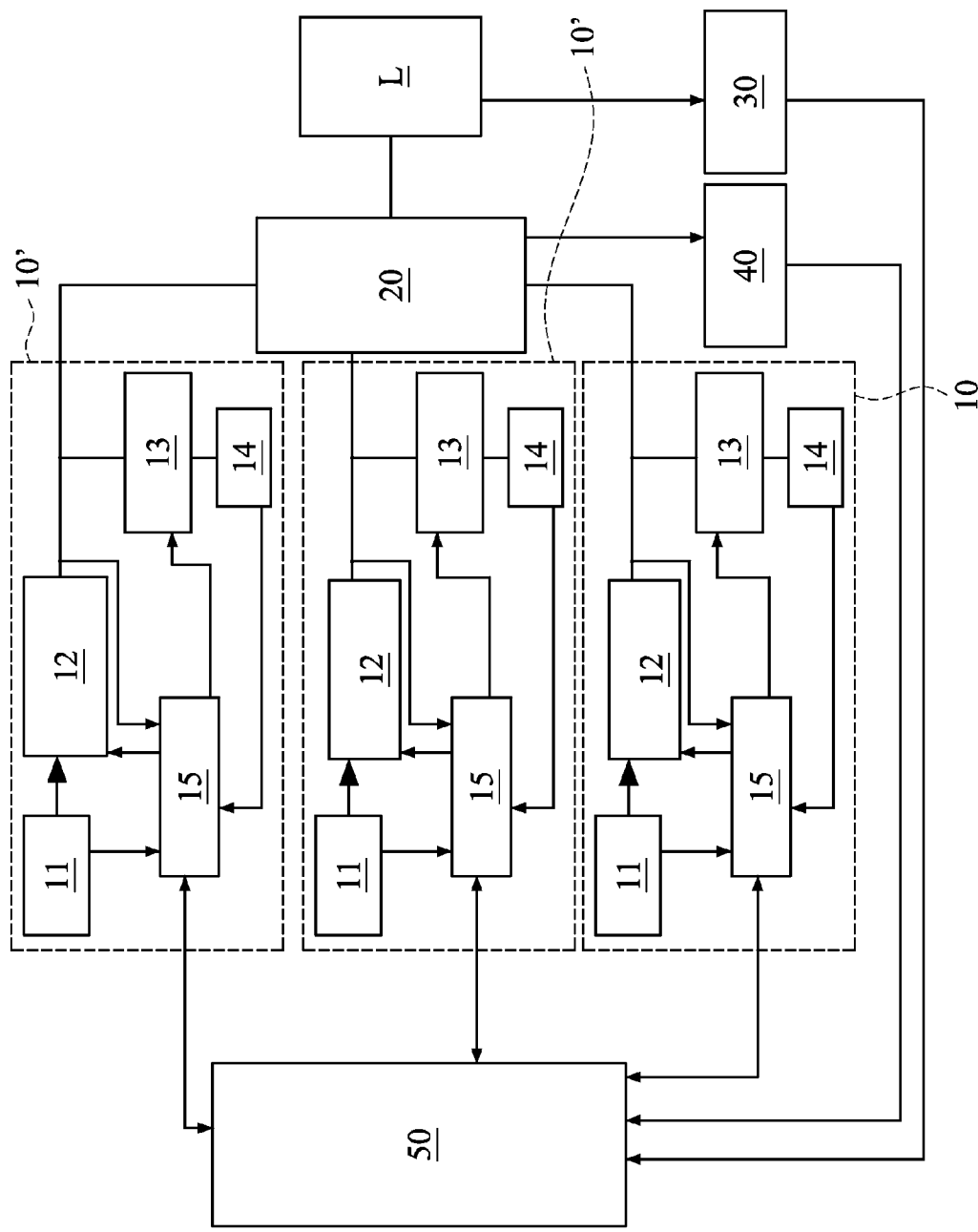
FIG. 1 is a schematic drawing of a system of a plurality of series-connected fuel cell converter devices according to an embodiment of the present invention.

Referring to FIG. 1, in an embodiment of the present invention, a system of a plurality of series-connected fuel cell converter devices includes: a plurality of fuel cell converter devices 10, a series connection unit 20, a power control unit 30, a Mux control unit 40, and a master controller 50.

The fuel cell converter devices 10 are configured to generate electricity and output the electricity via their output ends.

The series connection unit 20 is electrically connected to the output end of each fuel cell converter device 10 so as to output the electrical energy generated by each fuel cell converter device 10 to a load L.

The power control unit 30 is electrically connected to the load L and is configured to calculate the amount of electricity required by the load L.

The Mux control unit 40 is electrically connected to the series connection unit 20 and is configured to read the amount of electrical energy output by the series connection unit 20.

The master controller 50, which is electrically connected to each fuel cell converter device 10, the power control unit 30, and the Mux control unit 40, is configured to read signals from the power control unit 30 and the Mux control unit 40. According to the signals read, the master controller 50 determines the number of the fuel cell converter devices 10 to be turned on or controls the amount of electricity to be discharged by each fuel cell converter device 10.

Each fuel cell converter device 10 includes a fuel cell 11, a converter 12, a bi-directional converter 13, a battery 14, and a sub-controller 15.

Each fuel cell 11 generates electrical energy by chemical reactions.

Each converter 12 is electrically connected to the corresponding fuel cell 11 and the series connection unit 20 and is configured to convert the electrical energy generated by the corresponding fuel cell 11 and deliver the converted electrical energy to the series connection unit 20. The series connection unit 20 combines the output of all the fuel cell converter devices 10 and delivers the combined output to the load L.

Each bi-directional converter 13 is electrically connected to the series connection unit 20, and each battery 14 is electrically connected to the corresponding bi-directional converter 13. Each bi-directional converter 13 controls discharging or charging of the corresponding battery 14 and outputs the electricity of the corresponding battery 14 to the series connection unit 20.

Each sub-controller 15 is electrically connected to the master controller 50, the corresponding converter 12, and the corresponding fuel cell 11. Upon receiving a control signal from the master controller 50, each sub-controller 15 controls the amount of electricity to be output by the corresponding converter 12. Each sub-controller 15 also reads the amount of electricity stored in the corresponding battery 14 and controls the corresponding bi-directional converter 13 accordingly so as to discharge or charge the corresponding battery 14.

Based on signals read from the Mux control unit 40 and the power control unit 30, the master controller 50 determines which fuel cell converter devices 10 should be turned on and transmits a control signal to each sub-controller 15.

Figure 2:
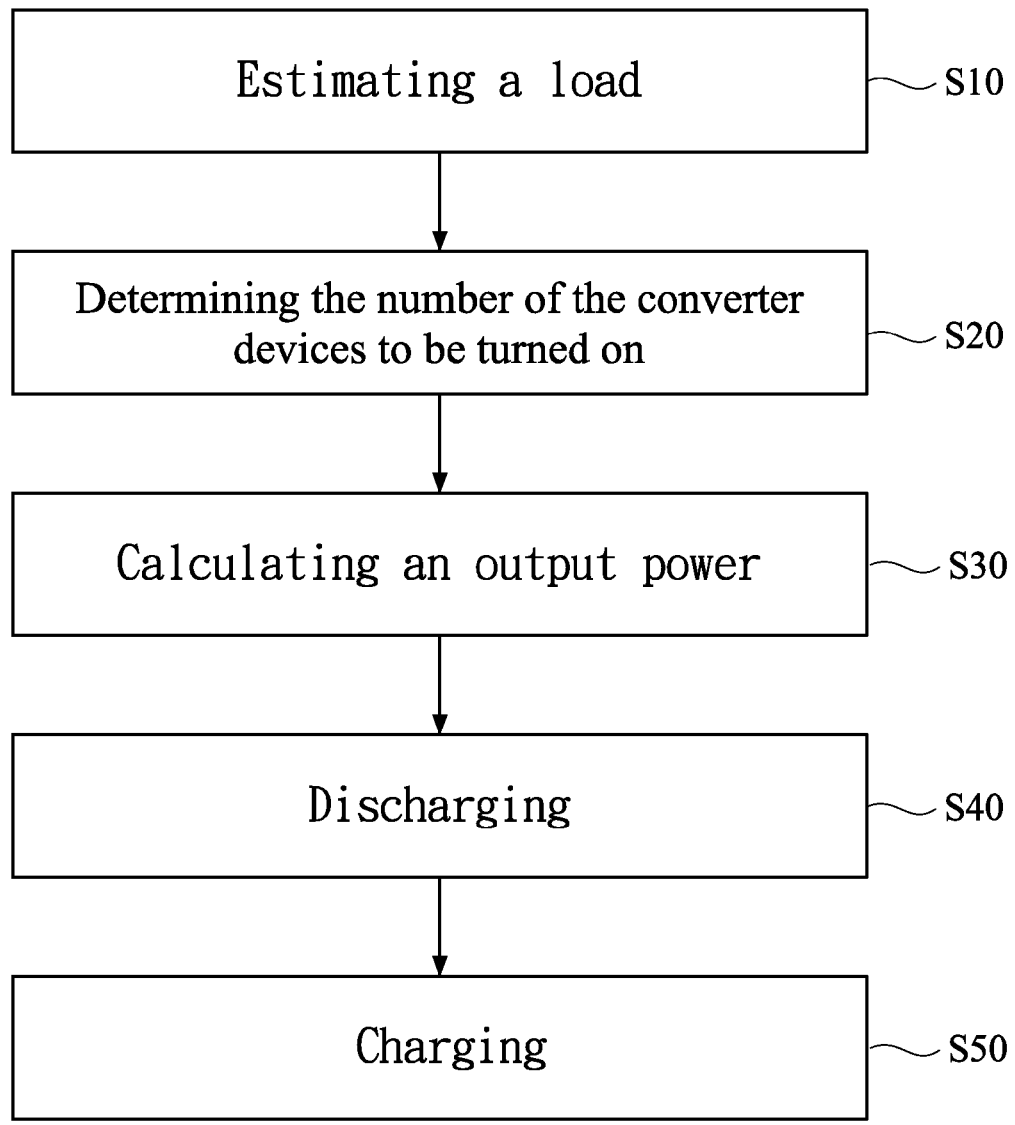
FIG. 2 is a flowchart of a method according to another embodiment of the present invention for controlling the system of FIG. 1.

Referring to FIG. 2, in another embodiment of the present invention, a method for controlling the foregoing system of the a plurality of series-connected fuel cell converter devices 10 includes: a step of estimating a load (S10), a step of determining the number of the fuel cell converter devices to be turned on (S20), a step of calculating an output power (S30), a step of discharging (S40), and a step of charging (S50), as described in detail below.

The step of estimating a load (S10): The power control unit 30 calculates or reads a load power value and a load output voltage value that are required by the load L.

The step of determining the number of the fuel cell converter devices 10 to be turned on (S20): The number of the fuel cell converter devices 10 that need to be turned on is determined according to the load power value or the load output voltage value. The fuel cell converter devices 10 selected are defined as the working fuel cell converter devices 10'.

More specifically, to determine the number of the working fuel cell converter devices 10', the master controller 50 either divides the load power value by the maximum output power of each fuel cell converter device 10, or divides the load output voltage by the maximum output voltage of each fuel cell converter device 10. The master controller 50 controls the fuel cell converter devices 10 that need to be turned on, and the fuel cell converter devices 10 actually turned on are defined as the working fuel cell converter devices 10'. The output ends of the working fuel cell converter devices 10' are connected in series by the series connection unit 20 so as to output electrical energy.

The step of calculating an output power (S30): The master controller 50 calculates a required output power assigned to and to be provided by each working fuel cell converter device 10'. More specifically, the master controller 50 divides the load power value by the number of the working fuel cell converter devices 10' to obtain the required output power of each working fuel cell converter device 10'.

The step of discharging (S40): When the available output power of the fuel cell 11 in any of the working fuel cell converter devices 10' is lower than the required output power, the bi-directional converter 13 in that working fuel cell converter device 10' discharges the corresponding battery 14, so as for the electricity of the battery 14 to compensate for the insufficiency of electricity, and for the output power of that working fuel cell converter device 10' to reach the required output power. Each bi-directional converter 13 is controlled by the corresponding sub-controller 15 with regard to whether or not to discharge the corresponding battery 14.

The step of charging (S50): When the amount of electricity of the certain battery 14 of each working fuel cell converter devices 10' is smaller than a predetermined amount, and the available output power of the corresponding fuel cell 11 is higher than the required output power (meaning that the fuel cell 11 not only can provide the electricity required by the load L but also has extra electricity for storage in the corresponding battery 14), the fuel cell 11 charges the battery 14 for later use. Each bi-directional converter 13 is controlled by the corresponding sub-controller 15 with regard to whether or not to charge the corresponding battery 14.

With the present invention, power supply will not be interrupted if any one of the fuel cell converter devices 10 is damaged; furthermore, unstable power supply which may otherwise occur during fuel refill is prevented. The present invention also features expandability, for more fuel cell converter devices 10 can be added to cope with a significant increase in the load L. Besides, in cases where the load L increases abruptly such that the output power of the working fuel cell converter devices 10' is insufficient to meet the requirement of the load L, the batteries 14 are discharged to maintain power supply stability.

The embodiments described above serve to demonstrate the features of the present invention so that a person skilled in the art can understand the contents disclosed herein and implement the present invention accordingly. The embodiments, however, are not intended to limit the scope of the present invention. Therefore, all equivalent changes or modifications which do not depart from the spirit of the present invention should fall within the scope of the present invention, which is defined only by the appended claims.

What is claimed is:

1. A system of a plurality of series-connected fuel cell converter devices, comprising:
    a plurality of fuel cell converter devices for providing electricity;
    a series connection unit electrically connected to an output end of each said fuel cell converter device and configured to output electrical energy generated by each said fuel cell converter device;
    a power control unit electrically connected to a load and configured to calculate an amount of electricity required by the load;
    a Mux control unit electrically connected to the series connection unit and configured to read an amount of electrical energy output by the series connection unit; and
    a master controller electrically connected to each said fuel cell converter device, the power control unit, and the Mux control unit, wherein the master controller is configured to read from the power control unit and the Mux control unit and control an amount of electricity to be discharged by the fuel cell converter devices.

2. The system of claim 1, wherein each said fuel cell converter device comprises:
    a fuel cell for generating electrical energy;
    a converter electrically connected to the fuel cell and the series connection unit, wherein the converter is configured to convert the electrical energy output by the fuel cell and deliver the converted electrical energy to the series connection unit;
    a bi-directional converter electrically connected to the series connection unit;
    a battery electrically connected to the bi-directional converter; and
    a sub-controller electrically connected to the master controller, the converter, and the fuel cell, wherein the sub-controller is configured to receive a control signal from the master controller and control the converter according to the control signal, and wherein the sub-controller is configured to read an amount of electricity stored in the battery and control the bi-directional converter accordingly so as to discharge or charge the battery.

3. The system of claim 2, wherein the master controller determines, according to signals read by the Mux control unit and the power control unit, which of said fuel cell converter devices need to be turned on, and transmits a said control signal to each said sub-controller.

4. A method for controlling the system of claim 1, comprising:
    a step of estimating a load, wherein a load power value and a load output voltage value required by the load are calculated;
    a step of determining the number of said fuel cell converter devices to be turned on, wherein the number of said fuel cell converter devices that need to be turned on is determined according to the load power value or the load output voltage value, and the fuel cell converter devices selected are defined as working fuel cell converter devices;
    a step of calculating an output power, wherein a required output power assigned to and to be provided by each said working fuel cell converter device is calculated;
    a step of discharging, wherein when a fuel cell in any said working fuel cell converter device has an available output power lower than the required output power, a bi-directional converter of the working fuel cell convert device discharges a corresponding battery so that the working fuel cell converter device provides an output power as high as the required output power; and
    a step of charging, wherein when an amount of electricity of one said battery of the working fuel cell converter devices is smaller than a predetermined amount, and the available output power of the corresponding said fuel cell is higher than the required output power, the fuel cell begins to charge the corresponding battery.

5. The method of claim 4, wherein the step of determining the number of said fuel cell converter devices to be turned on comprises either dividing the load power value by a maximum output power of each said fuel cell converter device, or dividing the load output voltage value by a maximum output voltage of each said fuel cell converter device, so as to calculate the number of the working fuel cell converter devices.

6. The method of claim 5, wherein the step of calculating an output power comprises dividing the load power value by the number of the working fuel cell converter devices so as to obtain the required output power to be provided by each said working fuel cell converter device.

7. The method of claim 6, wherein the working fuel cell converter devices are connected in series by the series connection unit.

8. The method of claim 7, wherein the step of estimating a load comprises calculating, by the power control unit, the load power value and the load output voltage value required by the load.

9. The method of claim 8, wherein the step of determining the number of said fuel cell converter devices to be turned on comprises controlling, by the master controller and according to the load power value or the load output voltage value, the working fuel cell converter devices to be turned on.

10. The method of claim 9, wherein the step of calculating an output power comprises calculating, by the master controller, the required output power to be provided by each said working fuel cell converter device.

11. The method of claim 10, wherein the step of discharging comprises controlling the bi-directional converter of each said working fuel cell converter device by a corresponding sub-controller so as to control discharging of the corresponding battery.

12. The method of claim 11, wherein the step of charging comprises controlling the bi-directional converter of each said working fuel cell converter device by the corresponding sub-controller so as to control charging of the corresponding battery.

* * * * *